US012785143B2

(12) United States Patent
Cho et al.

(10) Patent No.: US 12,785,143 B2
(45) Date of Patent: Nov. 3, 2026

(54) ELECTROLYTE FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: In Haeng Cho, Daejeon (KR); Sung Jin Kim, Daejeon (KR); Yu Na Shim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 279 days.

(21) Appl. No.: 17/401,916

(22) Filed: Aug. 13, 2021

(65) Prior Publication Data

US 2022/0052379 A1 Feb. 17, 2022

(30) Foreign Application Priority Data

Aug. 14, 2020 (KR) ........................ 10-2020-0102228

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01)

(58) Field of Classification Search
CPC ......... H01M 10/0525; H01M 10/0567; H01M 10/0569
See application file for complete search history.

(56) References Cited

U.S. PATENT DOCUMENTS

| | | | | |
|---|---|---|---|---|
| 4,753,859 | A | 6/1988 | Brand et al. | |
| 2002/0160269 | A1 | 10/2002 | Choi et al. | |
| 2003/0124433 | A1* | 7/2003 | Kim | H01M 10/0565 429/231.95 |
| 2004/0142247 | A1 | 7/2004 | Yoshimura et al. | |
| 2005/0053840 | A1 | 3/2005 | Jo et al. | |
| 2008/0090154 | A1* | 4/2008 | Ihara | H01M 10/0568 429/188 |
| 2009/0286163 | A1 | 11/2009 | Shin et al. | |
| 2014/0032249 | A1 | 1/2014 | Kruglick | |
| 2015/0155538 | A1* | 6/2015 | Tang | H01M 50/434 429/188 |

(Continued)

FOREIGN PATENT DOCUMENTS

| | | | |
|---|---|---|---|
| CN | 1416191 | A | 5/2003 |
| CN | 101783422 | A | 7/2010 |
| CN | 102473963 | A | 5/2012 |

(Continued)

OTHER PUBLICATIONS

Extended European Search Report issued by the European Patent Office on Jan. 24, 2022.

(Continued)

*Primary Examiner* — Osei K Amponsah
(74) *Attorney, Agent, or Firm* — IP & T GROUP LLP

(57) ABSTRACT

An electrolyte for a lithium secondary battery according to exemplary embodiments may include an organic solvent, a lithium salt, and an additive including a polyalkylene glycol dialkyl ether compound having a weight average molecular weight in a specific range.

10 Claims, 1 Drawing Sheet

100

(56) References Cited

U.S. PATENT DOCUMENTS

| | | | | |
|---|---|---|---|---|
| 2016/0285128 | A1 | 9/2016 | Matsui et al. | |
| 2018/0233778 | A1* | 8/2018 | Park | H01M 10/0525 |

FOREIGN PATENT DOCUMENTS

| | | | |
|---|---|---|---|
| KR | 10-2003-0035521 | A | 5/2003 |
| KR | 10-0805123 | B1 | 2/2008 |
| KR | 10-2012-0101499 | A | 9/2012 |
| KR | 10-2014-0142705 | A | 12/2014 |
| KR | 10-2018-0093700 | A | 8/2018 |

OTHER PUBLICATIONS

Office Action for Chinese Patent Application No. 202110894696.7 issued by the Chinese Patent Office on May 12, 2025.

Office Action for Korean Patent Application No. 10-2020-0102228 issued by the Korean Patent Office on Jun. 23, 2025.

Office Action for Korean Patent Application No. 10-2020-0102228 issued by the Korean Patent Office on Feb. 13, 2026.

* cited by examiner

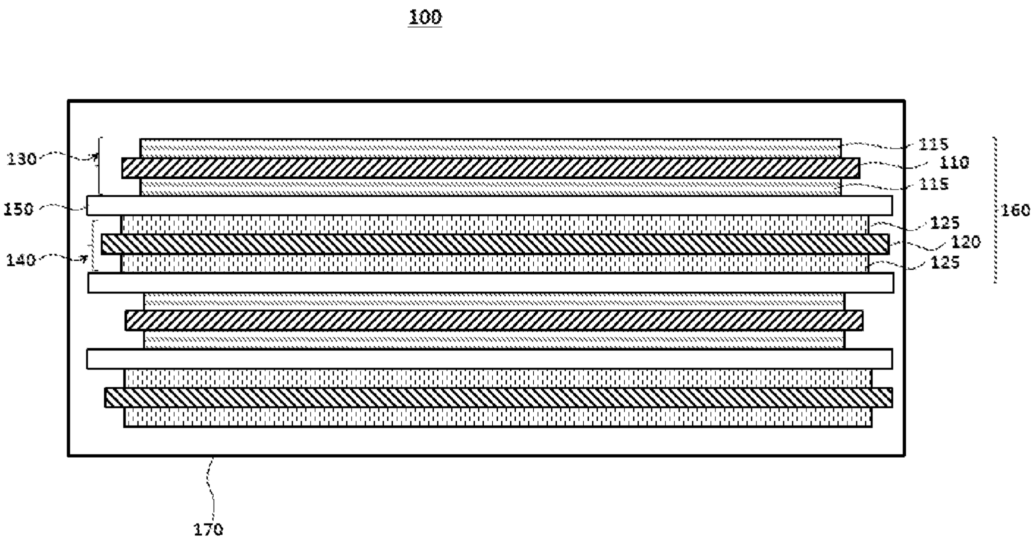
100
130
150
140
115
110
115
125
120
125
160
170

ELECTROLYTE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2020-0102228 filed on Aug. 14, 2020 in the Korean Intellectual Property Office (KIPO), the entire disclosure of which is incorporated by reference herein.

BACKGROUND OF THE INVENTION

1. Field of the Invention

The present invention relates to an electrolyte for a lithium secondary battery and a lithium secondary battery including the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. However, among them, the lithium secondary battery has a high operating voltage and a high energy density per unit weight, and is advantageous in terms of a charging speed and light weight. In this regard, the lithium secondary battery has been actively developed and applied as a power source.

In general, the lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

However, the above-described lithium secondary battery has problems in that, as side reactions between the electrolyte and the electrode are accelerated under high temperature conditions, a thickness of the electrode is increased and an internal resistance of the battery is increased.

To improve these problems, Korean Patent Laid-Open Publication No. 10-2012-0101499 discloses a high-voltage electrolyte for a lithium secondary battery, but the improvement is insufficient.

Therefore, in order to effectively improve the above-described problems, research and development of an electrolyte for a lithium secondary battery is continuously required.

PRIOR ART DOCUMENT

Patent Document

Korean Patent Laid-Open Publication No. 10-2012-0101499

SUMMARY OF THE INVENTION

One object of the present invention is to provide an electrolyte for a lithium secondary battery having excellent life-span and high temperature characteristics.

Another object of the present invention is to provide a lithium secondary battery including the electrolyte having excellent life-span and high temperature characteristics.

According to an aspect of the present invention, there is provided an electrolyte for a lithium secondary battery comprising: an organic solvent; a lithium salt; and an additive including a polyalkylene glycol dialkyl ether compound having a weight average molecular weight (Mw) of 1,000 to 20,000.

In one embodiment, the number of carbon atoms of alkyl groups at both ends of the polyalkylene glycol dialkyl ether compound may be each independently 1 to 4.

In one embodiment, the polyalkylene glycol dialkyl ether compound may include a polyethylene glycol dialkyl ether compound.

In one embodiment, the polyalkylene glycol dialkyl ether compound may be represented by Formula 1 below:

[Formula 1]

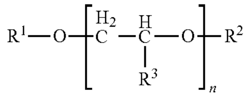

(in Formula 1, $R^1$ and $R^2$ may be each independently an alkyl group having 1 to 4 carbon atoms, $R^3$ may be hydrogen or a methyl group, and n may be 20 to 450).

In one embodiment, the polyalkylene glycol dialkyl ether compound may have a weight average molecular weight of 2,000 to 5,000.

In one embodiment, the polyalkylene glycol dialkyl ether compound may be included in an amount of 0.1 to 2.5% by weight based on a total weight of the electrolyte.

In one embodiment, the polyalkylene glycol dialkyl ether compound may include polyethylene glycol dimethyl ether.

In one embodiment, the organic solvent may include a linear carbonate solvent and a cyclic carbonate solvent.

In one embodiment, the electrolyte may further include an auxiliary additive including at least one of a fluorine-containing cyclic carbonate compound, a sultone compound, a cyclic sulfate compound, and a fluorine-containing lithium phosphate compound.

In one embodiment, the auxiliary additive may include a fluorine-containing cyclic carbonate compound, an alkyl sultone compound, an alkenyl sultone compound, a cyclic sulfate compound, and a fluorine-containing lithium phosphate compound.

In one embodiment, the auxiliary additive may be included in an amount of 1 to 5% by weight based on the total weight of the electrolyte.

In one embodiment, a ratio of the content of the auxiliary additive to the content of the polyalkylene glycol dialkyl ether compound may be 1 to 5.

According to another aspect of the present invention, there is provided a lithium secondary battery comprising: a cathode; an anode; a separation membrane interposed between the cathode and the anode; and the above-described electrolyte for a lithium secondary battery.

In one embodiment, the cathode may include a cathode active material including a lithium-transition metal oxide, and the lithium-transition metal oxide includes 80 mol % or more of nickel based on the total number of moles of all elements except for lithium and oxygen.

The electrolyte for a lithium secondary battery according to exemplary embodiments may include a polyalkylene glycol dialkyl ether compound as an additive. For example, the polyalkylene glycol dialkyl ether compound may form a solid-electrolyte interphase (SEI) having excellent stability on a surface of an electrode (e.g., a cathode). In this case, side reactions between an electrode active material and the electrolyte may be effectively suppressed.

The lithium secondary battery according to the exemplary embodiments may have excellent life-span characteristics by employing the above-described electrolyte for a lithium secondary battery, and may effectively suppress an increase in the thickness of the electrode and an increase in the internal resistance of the battery during storage at a high temperature. In addition, it is possible to exhibit an improved capacity retention rate and capacity recovery rate.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a schematic cross-sectional view illustrating a lithium secondary battery according to exemplary embodiments.

DETAILED DESCRIPTION OF THE INVENTION

As used herein, the term "-compound" may refer to a compound to which the "-compound" is attached and a derivative thereof. For example, "polyalkylene glycol dialkyl ether compound" may refer to polyalkylene glycol dialkyl ether, and a compound which has polyalkylene glycol dialkyl ether as a matrix and a substituent bonded to the matrix.

The electrolyte for a lithium secondary battery according to exemplary embodiments may include a polyalkylene glycol dialkyl ether compound having a weight average molecular weight (Mw) of 1,000 to 20,000.

The lithium secondary battery according to exemplary embodiments may implement improved life-span and high temperature characteristics by employing the above-described electrolyte.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

<Electrolyte for Lithium Secondary Battery>

The electrolyte for a lithium secondary battery (hereinafter, may be abbreviated as an electrolyte) according to exemplary embodiments may include an organic solvent, and a lithium salt and an additive which are mixed or dissolved in the organic solvent.

For example, the organic solvent may include an organic compound which provides sufficient solubility to the lithium salt and the additive, and does not have reactivity in the lithium secondary battery.

For example, the organic solvent may include a carbonate solvent, an ester solvent, an ether solvent, a ketone solvent, an alcohol solvent, a nonprotonic solvent and the like. These solvents may be used alone or in combination of two or more thereof.

In some embodiments, the carbonate solvent may include a linear carbonate solvent and a cyclic carbonate solvent.

For example, the linear carbonate solvent may include at least one of dimethyl carbonate (DMC), ethyl methyl carbonate (EMC), diethyl carbonate (DEC), methyl propyl carbonate, ethyl propyl carbonate and dipropyl carbonate.

For example, the cyclic carbonate solvent may include at least one of ethylene carbonate (EC), propylene carbonate (PC), and butylene carbonate.

In some embodiments, the organic solvent may include the linear carbonate solvent more than the cyclic carbonate solvent based on a volume.

For example, a mixing volume ratio of the linear carbonate solvent and the cyclic carbonate solvent may be 1:1 to 9:1, and preferably 1.5:1 to 4:1.

For example, the ester solvent may include methyl acetate (MA), ethyl acetate (EA), n-propyl acetate (n-PA), 1,1-dimethylethyl acetate (DMEA), methyl propionate (MP), ethyl propionate (EP), γ-butyrolactone (GBL), decanolide, valerolactone, mevalonolactone, caprolactone and the like.

For example, the ether solvent may include dibutyl ether, tetraethylene glycol dimethyl ether (TEGDME), diethylene glycol dimethyl ether (DEGDME), dimethoxy ethane, 2-methyltetrahydrofuran, tetrahydrofuran and the like.

For example, the ketone solvent may include cyclohexanone and the like.

For example, the alcohol solvent may include ethyl alcohol, isopropyl alcohol and the like.

For example, the nonprotonic solvent may include a nitrile solvent, an amide solvent such as dimethyl formamide (DMF), etc., a dioxolane solvent such as 1,3-dioxolane, etc., a sulfolane solvent and the like.

In one embodiment, the organic solvent may include the carbonate solvent. As a more specific example, the organic solvent may include ethylene carbonate (EC), ethyl methyl carbonate (EMC), dimethyl carbonate (DMC), diethyl carbonate (DEC), or a combination thereof.

For example, the organic solvent may be included in a remaining amount except for the lithium salt and additive to be described below in the electrolyte.

For example, the lithium salt may be represented by $Li^+X^-$. For example, the anion ($X^-$) may include $F^-$, $Cl^-$, $Br^-$, $I^-$, $NO_3^-$, $N(CN)_2^-$, $BF_4^-$, $ClO_4^-$, $PF_6^-$, $SbF_6^-$, $asF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, $PO_2F_2^-$ and the like. The anion may be used alone or in combination of two or more thereof.

In some embodiments, the lithium salt may include lithium hexafluorophosphate ($LiPF_6$).

In one embodiment, the lithium salt may be included in a concentration of about 0.1 to 5 M, and preferably about 0.5 to 2 M based on the organic solvent. Lithium ions and/or electrons may smoothly move within the above range.

In one embodiment, the additive may include a polyalkylene glycol dialkyl ether (PAGDE) compound.

For example, the polyalkylene glycol dialkyl ether compound may form a solid-electrolyte interphase (SEI) having excellent stability on a surface of an electrode (e.g., a cathode). In this case, side reactions between an electrode active material and the electrolyte may be effectively suppressed. Accordingly, the life-span of the lithium secondary battery may be increased, and an increase in a thickness of the electrode and an increase in an internal resistance of the battery may be suppressed during storage at a high temperature.

In some embodiments, the polyalkylene glycol dialkyl ether compound may include a compound in which each of hydroxy groups (—OH) present at both ends of a polyalkylene glycol compound including polyethylene glycol or polypropylene glycol forms an ether bond (—O—) with an alkyl group. In this case, the hydroxyl group (—OH) may be substituted by an alkoxy group (—OR).

In some embodiments, the polyalkylene glycol dialkyl ether compound may be a polyethylene glycol dialkyl ether compound. In this case, formation of the SEI film may be accelerated.

In one embodiment, the polyalkylene glycol dialkyl ether compound may have a weight average molecular weight (Mw) of 1,000 to 20,000.

For example, when the weight average molecular weight of the polyalkylene glycol dialkyl ether compound is less than 1,000, the internal resistance of the battery may be increased during storage at a high temperature.

In addition, for example, when the weight average molecular weight of the polyalkylene glycol dialkyl ether compound exceeds 20,000, the polyalkylene glycol dialkyl ether compound may be tangled as a molecule itself or may be tangled with surrounding molecules. In this case, an excessively thick SEI film may be formed. Therefore, the thickness of the electrode may be non-uniformly increased and the internal resistance of the battery may be increased. In addition, the tangled polymer may act as foreign matters, thereby causing a decrease in the life-span and capacity of the battery.

In some embodiments, the polyalkylene glycol dialkyl ether compound may have a weight average molecular weight of 2,000 to 5,000. In this case, particularly, an increase in the thickness of the electrode and an increase in the internal resistance of the battery during storage at a high temperature may be more effectively suppressed, and in particular, the battery may ensure superior life-span, capacity retention rate and capacity recovery rate.

In one embodiment, the number of carbon atoms of the alkyl groups at both ends of the polyalkylene glycol dialkyl ether compound may each independently be 1 to 4. Preferably, the alkyl groups at both ends may be methyl groups. In this case, the SEI film may be more effectively formed.

In some embodiments, the alkyl groups at both ends of the polyalkylene glycol dialkyl ether compound may be the same as each other. For example, both of the alkyl groups at both ends may be methyl groups.

In one embodiment, the polyalkylene glycol dialkyl ether compound may be represented by Formula 1 below.

[Formula 1]

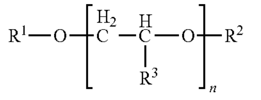

In Formula 1, $R^1$ and $R^2$ may be independently an alkyl group having 1 to 4 carbon atoms, and $R^3$ may be hydrogen or a methyl group.

For example, a value of n may be adjusted in a range in which the polyalkylene glycol dialkyl ether compound of Formula 1 above has a weight average molecular weight of 1,000 to 20,000. For example, n may be 20 to 450.

In some embodiments, the value of n may be adjusted in a range in which the polyalkylene glycol dialkyl ether compound of Formula 1 above has a weight average molecular weight of 2,000 to 5,000. For example, n may be 35 to 110.

In some embodiments, the polyalkylene glycol dialkyl ether compound may include polyethylene glycol dimethyl ether. In this case, particularly, the life-span and high-temperature storage characteristics of the secondary battery including the electrolyte may be further improved.

In one embodiment, the polyalkylene glycol dialkyl ether compound may be included in an amount of 0.1 to 2.5% by weight ('wt. %') based on a total weight of the electrolyte.

For example, when a content of the polyalkylene glycol dialkyl ether compound is less than 0.1 wt. %, the high-temperature storage characteristics of the battery may be reduced.

In addition, for example, when the content of the polyalkylene glycol dialkyl ether compound exceeds 2.5 wt. %, oxidation of the polyalkylene glycol dialkyl ether compound is accelerated during operation of the battery, such that a thickness of a film on a surface of the cathode may be excessively increased. In this case, the capacity and life-span of the battery may be reduced.

In some embodiments, the polyalkylene glycol dialkyl ether compound may be included in an amount of 0.1 to 2 wt. %, or 0.1 to 1 wt. % based on the total weight of the electrolyte.

For example, metal (e.g., transition metal) may be eluted from the cathode of the lithium secondary battery according to the use thereof. The eluted metal may be electrodeposited on an anode, thereby causing a deterioration in performance of the anode. In addition, when driving the lithium secondary battery at a high voltage, a film on the surface of the cathode may be decomposed to cause side reactions between the surface of the cathode and the electrolyte.

For example, the polyalkylene glycol dialkyl ether compound may include a plurality of oxygen atoms, and the oxygen atoms may be provided as oxygen bonds capable of coordination bonds. The oxygen bond may be bonded with the electrode surface to form a stable SEI film. In this case, stability of the electrode surface structure may be increased, and side reactions between the electrode and the electrolyte may be suppressed. Accordingly, generation of gas may be suppressed during repeated charging/discharging or exposure to high temperature, and swelling and increase in the resistance of the battery may be suppressed.

In addition, for example, the polyalkylene glycol dialkyl ether compound may accelerate formation of the SEI film having a stable structure through the plurality of oxygen atoms to prevent side reactions between the electrolyte and the electrode. In this case, reduction of lithium ions and decomposition of the electrolyte and the active material may be suppressed. Therefore, cycle characteristics and high-temperature stability of the secondary battery may be improved.

For example, the polyalkylene glycol dialkyl ether compound may stabilize the structure of the cathode. In this case, when using and storing the lithium secondary battery at a high temperature, elution of metal, generation of gas, and expansion of volume (thickness) may be suppressed. Accordingly, the life-span and high-temperature storage characteristics of the battery may be improved. In addition, an increase in the resistance of the battery may be suppressed when driving at a high voltage.

In one embodiment, the electrolyte may include an auxiliary additive including at least one of a cyclic carbonate compound including a double bond, a fluorine-containing cyclic carbonate compound, a sultone compound, a cyclic sulfate compound, and a fluorine-containing lithium phosphate compound.

In one embodiment, the auxiliary additive may include at least one of a fluorine-containing cyclic carbonate compound, a sultone compound, a cyclic sulfate compound, and a fluorine-containing lithium phosphate compound.

In some embodiments, the auxiliary additive may include a fluorine-containing cyclic carbonate compound, a sultone compound, a cyclic sulfate compound, and a fluorine-containing lithium phosphate compound. In this case, by the combination of the above-described polyalkylene glycol dialkyl ether compound and the auxiliary additive, it is possible to implement a lithium secondary battery having more improved life-span characteristics and high-temperature storage characteristics.

In some embodiments, the content of the auxiliary additive in the electrolyte may be 0.1 to 10 wt. %, preferably 0.5 to 7.5 wt. %, and more preferably 1 to 5 wt. %.

In some embodiments, a ratio of the content of the auxiliary additive to the content of the polyalkylene glycol dialkyl ether compound in the electrolyte may be 0.5 to 10, and preferably 1 to 5. In this case, it is possible to implement the lithium secondary battery having more improved life-span characteristics and high-temperature storage characteristics.

For example, the cyclic carbonate compound including the double bond may include vinylene carbonate, vinyl ethylene carbonate and the like.

For example, in the fluorine-containing cyclic carbonate compound, a fluorine atom may be directly bonded to at least one carbon atom of the cyclic carbonate compound, or a substituent having a fluorine atom bonded thereto (e.g., a fluorine-substituted alkyl group) may be bonded to the carbon atom.

For example, the fluorine-containing cyclic carbonate compound may include fluoroethylene carbonate and the like.

For example, the cyclic carbonate compound including the double bond and the fluorine-containing cyclic carbonate compound may improve thermal and electrical endurance of a film formed on the electrode surface.

For example, the cyclic carbonate compound including the double bond and the fluorine-containing cyclic carbonate compound may be included in an amount of 0.1 to 5 wt. %, 0.25 to 2 wt. %, or 0.5 to 1 wt. % based on the total weight of the electrolyte, respectively.

For example, when the cyclic carbonate compound including the double bond and the fluorine-containing cyclic carbonate compound are included in an amount of less than 0.1 wt. %, the durability of the film may be reduced. In addition, when these compounds are included in an amount of exceeding 5 wt. %, the thickness of the film may be excessively increased. In this case, the resistance of the battery may be increased and the output may be decreased.

For example, the sultone compound may include at least one of an alkyl sultone compound and an alkenyl sultone compound.

For example, the alkyl sultone compound may have only a saturated bond in a ring, and the alkenyl sultone compound may have an unsaturated bond (e.g., C═C double bond) in the ring.

For example, the alkyl sultone compound may include at least one of 1,3-propane sultone (PS) and 1,4-butane sultone.

For example, the alkenyl sultone compound may include at least one of ethene sultone, 1,3-propene sultone (PRS), 1,4-butene sultone, and 1-methyl-1,3-propene sultone.

For example, the sultone compound may be included in an amount of 0.1 to 5 wt. %, 0.25 to 2 wt. %, or 0.5 to 1 wt. % based on the total weight of the electrolyte.

For example, the cyclic sulfate compound may include 1,2-ethylene sulfate, 1,2-propylene sulfate and the like.

For example, the cyclic sulfate compound may be included in an amount of 0.1 to 5 wt. %, 0.25 to 2 wt. %, or 0.5 to 1 wt. % based on the total weight of the electrolyte.

For example, the sultone compound and the cyclic sulfate compound may form a more stable ion conductive film on the electrode surface.

The fluorine-containing lithium phosphate compound may include at least one of lithium difluoro phosphate, lithium tetrafluoro oxalate phosphate, and lithium difluorobis (oxalato) phosphate.

For example, the fluorine-containing lithium phosphate compound may be included in an amount of 0.1 to 5 wt. %, 0.25 to 2 wt. %, or 0.5 to 1 wt. % based on the total weight of the electrolyte.

In some embodiments, the electrolyte may be a non-aqueous electrolyte which does not include water.

<Lithium Secondary Battery>

FIG. 1 is a schematic cross-sectional view illustrating a lithium secondary battery according to an exemplary embodiment of the present invention.

Referring to FIG. 1, a lithium secondary battery 100 may include an electrode assembly including a cathode 130, an anode 140, and a separation membrane 150 interposed between the cathode and the anode. The electrode assembly may be housed together with the electrolyte according to the above-described exemplary embodiments in a case 170 to be impregnated.

The cathode 130 may include a cathode current collector 110 and a cathode active material layer 115 formed on the cathode current collector 110.

For example, the cathode active material may include a compound capable of reversibly intercalating and deintercalating lithium ions.

For example, the cathode active material may include a lithium transition metal oxide. For example, the lithium transition metal oxide includes nickel (Ni), and may further include at least one of cobalt (Co) and manganese (Mn).

In some embodiments, a content of nickel in the lithium-transition metal oxide may be 80 mol % or more based on a total number of moles of all elements except for lithium and oxygen. For example, as the content of nickel in the lithium-transition metal oxide is increased, a high capacity may be implemented, but chemical stability may be deteriorated. However, by employing the above-described electrolyte, it is possible to compensate for the chemical instability caused by the high content of nickel.

In some embodiments, the lithium-transition metal oxide may be represented by Formula 2 below.

$$Li_xNi_aCo_bM_cO_y \quad \text{[Formula 2]}$$

In Formula 2, M may be at least one of Al, Zr, Ti, B, Mg, Mn, Ba, Si, Y, W and Sr, and x, y, a, b and c may be in ranges of $0.8 \leq x \leq 1.2$, $1.9 \leq y \leq 2.1$, $0.5 \leq a \leq 1$, $0 \leq c/(a+b) \leq 0.13$ and $0 \leq c \leq 0.11$, respectively.

In some embodiments, a may be in a range of $0.8 \leq a \leq 1$.

For example, a cathode slurry may be prepared by mixing the cathode active material with a cathode forming binder, a conductive material and/or a dispersant in a solvent. The cathode slurry may be applied to the cathode current collector 110, followed by drying and rolling to prepare the cathode 130.

For example, the cathode current collector 110 may include stainless steel, nickel, aluminum, titanium, copper, or an alloy thereof, and preferably includes aluminum or an aluminum alloy.

For example, the cathode forming binder may include at least one of an organic binder such as vinylidene fluoride-hexafluoropropylene copolymer (PVDF-co-HFP), polyvinylidene fluoride (PVDF), polymethyl methacrylate, etc.; or an aqueous binder such as styrene-butadiene rubber (SBR).

For example, the cathode forming binder and a thickener such as carboxymethyl cellulose (CMC) may be used together.

In some embodiments, a PVDF-based binder may be used as the cathode forming binder. In this case, an amount of the binder for forming the cathode active material layer may be reduced and an amount of the cathode active material may be relatively increased, thereby improving the output and capacity of the battery.

For example, the conductive material may be included to facilitate electron transfer between the active material particles. For example, the conductive material may include at least one of a carbon-based conductive material such as graphite, carbon black, graphene, carbon nanotubes, etc.; and a metal-based conductive material such as tin, tin oxide, titanium oxide, or a perovskite material such as $LaSrCoO_3$, and $LaSrMnO_3$.

The anode 140 may include an anode current collector 120 and an anode active material layer 125 formed on the anode current collector 120.

For example, the anode active material may be a material capable of absorbing and desorbing lithium ions. For example, the anode active material may include at least one of a carbon-based material such as crystalline carbon, amorphous carbon, carbon composite, carbon fiber, etc.; and a lithium alloy.

For example, the amorphous carbon may include at least one of hard carbon, cokes, mesocarbon microbead (MCMB) calcined at 1500° C. or lower, and mesophase pitch-based carbon fiber (MPCF).

For example, the crystalline carbon may include at least one of graphite-based carbon such as natural graphite, graphite cokes, graphite MCMB, graphite MPCF, etc.

For example, the lithium alloy may include at least one of aluminum, zinc, bismuth, cadmium, antimony, silicon, lead, tin, gallium and indium.

In some embodiments, the anode active material may include a silicon-based active material.

For example, the anode current collector 120 may include stainless steel, nickel, aluminum, titanium, copper, or an alloy thereof, and preferably includes aluminum or an aluminum alloy.

For example, an anode slurry may be prepared by mixing the anode active material with an anode forming binder, a conductive material and/or a dispersant in a solvent. The anode slurry may be applied on the anode current collector 120, followed by drying and rolling to prepare the anode 140.

For example, the conductive material may include materials which are substantially the same as or similar to the above-described materials.

In some embodiments, the anode forming binder may use styrene-butadiene rubber (SBR). In addition, a thickener such as carboxymethyl cellulose (CMC) may be used together with the SBR.

For example, the separation membrane 150 may be interposed between the cathode 130 and the anode 140.

For example, the separation membrane 150 may include a porous polymer film made of a polyolefin polymer such as ethylene homopolymer, propylene homopolymer, ethylene/butene copolymer, ethylene/hexene copolymer, ethylene/methacrylate copolymer. In addition, the separation membrane may include a nonwoven fabric made of glass fiber having a high melting point, polyethylene terephthalate fiber or the like.

In some embodiments, the anode 140 may have an area and/or volume (e.g., a contact area with the separation membrane 150) larger than those/that of the cathode 130. In this case, lithium ions generated from the cathode 130 may smoothly move to the anode 140 without being precipitated in the middle.

For example, the electrode cell 160 may be formed by including the cathode 130, the anode 140 and the separation membrane 150.

For example, a plurality of electrode cells 160 may be laminated to form an electrode assembly. For example, the electrode assembly may be formed through winding, lamination, folding, or the like of the separation membrane.

The electrode assembly may be housed together with the above-described electrolyte for a lithium secondary battery in the case 170 to form the lithium secondary battery 100.

For example, each of the cathode current collector 110 and the anode current collector 120 belonging to each electrode cell 160 may have an electrode tab connected thereto.

For example, the electrode tabs may be connected with electrode leads. The electrode lead may protrude to an outside of the case 170.

For example, the lithium secondary battery 100 may be manufactured, for example, in a cylindrical shape using a can, a square shape, a pouch shape or a coin shape.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Comparative Example 1: Preparation of Base Electrolyte

A $LiPF_6$ solution was prepared by dissolving 1M $LiPF_6$ in a mixed solvent of EC/EMC (volume ratio of 1:3).

A base electrolyte was prepared by adding 1 wt. % of fluoroethylene carbonate, 1 wt. % of $LiPO_2F_2$, 0.5 wt. % of 1,3-propane sultone, 1 wt. % of 1,3-propene sultone and 0.5 wt. % of 1,2-ethylene sulfate to the $LiPF_6$ solution based on the total weight of the base electrolyte.

Comparative Examples 2 and 3

Electrolytes of Comparative Examples 2 and 3 were prepared by adding polyethylene glycols (PEGs) having a weight average molecular weight (Mw) of about 2,000 and 5,000, respectively, to the base electrolyte of Comparative Example 1 so as to be an amount of 1 wt. % based on the total weight of the electrolyte.

Comparative Examples 4 and 5

Electrolytes of Comparative Examples 4 and 5 were prepared by adding polyethylene glycol dimethyl ethers (PEGDMEs) having a weight average molecular weight (Mw) of about 240 and 500, respectively, to the base electrolyte of Comparative Example 1 so as to be an amount of 1 wt. % based on the total weight of the electrolyte.

Examples 1 to 5

Electrolytes of Examples 1 to 5 were prepared by adding polyethylene glycol dimethyl ethers having a weight average molecular weight (Mw) of about 1,000, 2,000, 5,000, 10,000 and 20,000, respectively, to the base electrolyte of Comparative Example 1 so as to be an amount of 1 wt. % based on the total weight of the electrolyte.

Preparation Example: Preparation of Lithium Secondary Battery

A cathode slurry was prepared by mixing 92 wt. % of a cathode active material in which $Li[Ni_{0.6}Co_{0.2}Mn_{0.2}]O_2$ and $Li[Ni_{0.8}Co_{0.1}Mn_{0.1}]O_2$ are mixed in a weight ratio of 6:4, 3 wt. % of polyvinylidene fluoride (PVdF) as a binder, and 5 wt. % of carbon black as a conductive material.

The prepared cathode slurry was uniformly applied to an aluminum foil having a thickness of 15 μm, followed by drying and rolling to prepare a cathode.

An anode slurry was prepared by mixing 97 wt. % of an anode active material in which artificial graphite and natural graphite were mixed in a weight ratio of 7:3, 1 wt. % of styrene-butadiene rubber (SBR) as a binder, and 2 wt. % of carboxymethyl cellulose (CMC) as a thickener.

The prepared anode slurry was uniformly applied to a copper foil having a thickness of 15 μm, followed by drying and rolling to prepare an anode having a density of 1.684 $g/cm^3$.

The prepared cathode and anode were cut into a predetermined size and laminated, and a separator (polyethylene, thickness 20 μm) was interposed between the cathode and the anode to form an electrode cell, and then tab parts of the cathode and the anode were welded, respectively.

A combination of the cathode/separator/anode was put into a pouch, followed by sealing three sides of the pouch except for an electrolyte injection side.

The electrolytes of the comparative examples and examples were injected through the electrolyte injection side, and the injection side was also sealed, followed by impregnation for 12 hours or more to manufacture a lithium secondary battery.

The manufactured secondary battery had a capacity of about 1.99 Ah.

Experimental Example 1: Evaluation of Life-Span (Evaluation of Capacity Retention Rate after Charging and Discharging 600 Times) at 45° C.

Charging (CC/CV 1C 4.2 V 0.1C CUT-OFF) and discharging (CC 1C 2.7 V CUT-OFF) the lithium secondary batteries of the examples and comparative examples were repeated 600 times at 45° C.

A capacity retention rate after charging and discharging 600 times was calculated as a percentage (%) by dividing the discharge capacity at 600th charging and discharging (hereinafter, abbreviated as "600th discharge capacity") by the discharge capacity at the first (initial capacity) charging and discharging (hereinafter, abbreviated as "1st discharge capacity") as follows.

$$\text{Capacity retention rate (\%)} = (\text{600th discharge capacity}/\text{1st discharge capacity}) \times 100$$

Experimental Example 2: Evaluation of High-Temperature Storage Characteristics (1) Evaluation of Change in Thickness of the Battery Thicknesses T1 of the batteries were measured after charging the lithium secondary batteries of the examples and comparative examples at room temperature at 4.2 V and 1C CC-CV for 3 hours. Herein, the thickness of the battery was measured using a plate thickness measuring device (Mitutoyo Co., 543-490B).

The charged lithium secondary batteries of the examples and comparative examples were left at 60° C. for 8 weeks using a thermostatic device, and the thicknesses T2 of the batteries were measured.

An increase rate in cell thickness after high-temperature storage was calculated as follows.

$$\text{Increase rate in battery thickness (\%)} = (T2 - T1)/T1 \times 100$$

(2) Evaluation of Ret. and Rec.

After the charged lithium secondary batteries of the examples and comparative examples were left at 60° C. for 8 weeks using the thermostatic device, and left at room temperature for additional 30 minutes (hereinafter, abbreviated as "after high-temperature storage"), capacity retention rates and capacity recovery rates were evaluated.

1) Ret. (Capacity Retention Rate)

After high-temperature storage of the charged lithium secondary batteries of the examples and comparative examples, 0.5C CC discharge (2.7 V cut-off) was performed to measure discharge capacities C2.

The capacity retention rate after high-temperature storage was calculated as a percentage by dividing the discharge capacity C2 by the initial capacity C1 measured before high-temperature storage as follows.

$$\text{Capacity retention rate (\%)} = (C2/C1) \times 100$$

2) Rec. (Capacity Recovery Rate)

After evaluating the capacity retention rates of the lithium secondary batteries of the examples and comparative examples according to the above-described 1), 0.5C CC-CV charge (4.2 V, 0.05C cut-off) and 0.5C CC discharge (2.7 V cut-off) were performed to measure discharge capacities C3.

The capacity recovery rate after high-temperature storage was calculated as a percentage by dividing the discharge capacity C3 by the initial capacity C1 measured before high-temperature storage as follows.

$$\text{Capacity recovery rate (\%)} = (C3/C1) \times 100$$

(3) Evaluation of Increase Rate in Internal Resistance (DCIR)

Increase Rate in DCIR After Leaving Under Conditions of 60° C. for 6 Weeks

At 60% point of state-of-charge (SOC), when sequentially increasing the C-rate to 0.2C, 0.5C, 1.0C, 1.5C, 2.0C, 2.5C and 3.0C, and performing charging and discharging at the C-rate for 10 seconds, terminal points of the voltage were composed with an equation of a straight line and a slope thereof was adopted as the DCIR.

When setting the DCIR measured after leaving the lithium secondary batteries of the examples and comparative examples at 60° C. for 8 weeks using the thermostatic device to be R2, and DCIR measured before high-temperature storage to be R1, the increase rate in the DCIR after high-temperature storage was calculated as follows.

$$\text{Increase rate in } DCIR \text{ (\%)} = (R2 - R1)/R1 \times 100$$

Referring to Table 1, it can be confirmed that the lithium secondary batteries of Preparation Examples 6 to 10 using the electrolytes of the examples have improved life-span compared to the lithium secondary batteries of Preparation Examples 1 to 5 using the electrolytes of the comparative examples, and an increase in thickness of the cathode and an increase in resistance of the battery during storage at a high temperature were suppressed.

DESCRIPTION OF REFERENCE NUMERALS

110: Cathode current collector
115: Cathode active material layer
120: Anode current collector
125: Anode active material layer
130: Cathode
140: Anode
150: Separation membrane
160: Electrode cell
170: Case

What is claimed is:

1. A lithium secondary battery comprising:

a cathode;

an anode including a carbon-based material;

a separation membrane interposed between the cathode and the anode; and an electrolyte including an organic solvent;

a lithium salt;

an additive including a polyalkylene glycol dialkyl ether compound having a weight average molecular weight (Mw) of 5,000 to 20,000; and

TABLE 1

| | | Secondary battery | | | | | | | | | |
|---|---|---|---|---|---|---|---|---|---|---|---|
| | | Preparative Example 1 | Preparative Example 2 | Preparative Example 3 | Preparative Example 4 | Preparative Example 5 | Preparative Example 6 | Preparative Example 7 | Preparative Example 8 | Preparative Example 9 | Preparative Example 10 |
| Electrolyte | | Comparative Example 1 | Comparative Example 2 | Comparative Example 3 | Comparative Example 4 | Comparative Example 5 | Example 1 | Example 2 | Example 3 | Example 4 | Example 5 |
| Additive | Type | — | PEG | | | | PEGDME | | | | |
| | Molecular weight (Mw) | | 2,000 | 5,000 | 240 | 500 | 1,000 | 2,000 | 5,000 | 10,000 | 20,000 |
| Initial | Thickness (mm) | 5.37 | 5.42 | 5.43 | 5.37 | 5.45 | 5.44 | 5.41 | 5.43 | 5.55 | 5.60 |
| | DCIR (mΩ) | 39.9 | 41.5 | 42.9 | 41.2 | 41.9 | 41.4 | 40.3 | 41.6 | 42.8 | 43.4 |
| Charging and discharging 600 times) at 45° C. | Capacity retention rate (%) | 66.9 | 70.9 | 72.3 | 68.3 | 69.1 | 70.3 | 78.7 | 80.1 | 74.2 | 71.1 |
| Storage at 60° C. for 8 weeks | Thickness (mm) | 7.31 | 6.91 | 6.83 | 7.00 | 6.89 | 6.71 | 6.51 | 6.37 | 6.89 | 7.13 |
| | Increase rate in thickness (%) | 36.1 | 27.5 | 25.8 | 30.4 | 26.4 | 23.3 | 20.3 | 17.3 | 24.1 | 27.3 |
| | Ret. (%) | 71.4% | 71.5% | 72.6% | 59.7% | 64.1% | 70.1% | 73.1% | 75.4% | 69.7% | 67.2% |
| | Rec. (%) | 70.2% | 70.6% | 71.0% | 57.8% | 62.9% | 68.4% | 71.1% | 73.1% | 67.4% | 65.1% |
| | DCIR (mΩ) | 69.25 | 69.10 | 68.80 | 74.62 | 73.00 | 70.40 | 68.60 | 68.00 | 73.42 | 74.20 |
| | Increase rate in DCIR (%) | 73.7 | 66.6 | 60.4 | 81.2 | 74.1 | 70.1 | 70.4 | 63.3 | 71.7 | 71.0 |

an auxiliary additive consisting essentially of lithium difluorophosphate, a fluorine-containing cyclic carbonate compound, a sultone compound, and a cyclic sulfate compound, wherein the polyalkylene glycol dialkyl ether compound is included in an amount of 0.1 to 2.5% by weight based on a total weight of the electrolyte, wherein the auxiliary additive is included in an amount of 1 to 5% by weight based on the total weight of the electrolyte, and wherein a ratio of the content of the auxiliary additive to the content of the polyalkylene glycol dialkyl ether compound is 4 to 5.

2. The lithium secondary battery according to claim 1, wherein the number of carbon atoms of alkyl groups at both ends of the polyalkylene glycol dialkyl ether compound is each independently 1 to 4.

3. The lithium secondary battery according to claim 1, wherein the polyalkylene glycol dialkyl ether compound includes a polyethylene glycol dialkyl ether compound.

4. The lithium secondary battery according to claim 1, wherein the polyalkylene glycol dialkyl ether compound is represented by Formula 1 below:

[Formula 1]

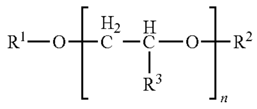

wherein, in Formula 1, $R^1$ and $R^2$ are each independently an alkyl group having 1 to 4 carbon atoms, $R^3$ is hydrogen or a methyl group, and n is 35 to 110.

5. The lithium secondary battery according to claim 1, wherein the polyalkylene glycol dialkyl ether compound includes polyethylene glycol dimethyl ether.

6. The lithium secondary battery according to claim 1, wherein the organic solvent includes a linear carbonate solvent and a cyclic carbonate solvent.

7. The lithium secondary battery according to claim 1, wherein the cathode includes a cathode active material including a lithium-transition metal oxide, and the lithium-transition metal oxide includes 80 mol % or more of nickel based on the total number of moles of all elements except for lithium and oxygen.

8. A lithium secondary battery comprising:

a cathode;

an anode including a carbon-based material;

a separation membrane interposed between the cathode and the anode; and an electrolyte including an organic solvent;

a lithium salt;

an additive including a polyalkylene glycol dialkyl ether compound having a weight average molecular weight (Mw) of 5,000 to 20,000; and an auxiliary additive consisting essentially of lithium difluorophosphate, a fluorine-containing cyclic carbonate compound, a sultone compound, and a cyclic sulfate compound, wherein the polyalkylene glycol dialkyl ether compound is included in an amount of 0.1 to 2.5% by weight based on a total weight of the electrolyte, wherein the auxiliary additive is included in an amount of 1 to 5% by weight based on the total weight of the electrolyte, and wherein a ratio of the content of the auxiliary additive to the content of the polyalkylene glycol dialkyl ether compound is 4 to 5.

9. The lithium secondary battery according to claim 1, wherein the cathode includes a cathode active material including a lithium-transition metal oxide, wherein the lithium-transition metal oxide includes nickel, cobalt and manganese, and a content of nickel in the lithium-transition metal oxide is 80 mol % or more based on a total number of moles of all elements except for lithium and oxygen.

10. The lithium secondary battery according to claim 8, wherein the cathode includes a cathode active material including a lithium-transition metal oxide, wherein the lithium-transition metal oxide includes nickel, cobalt and manganese, and a content of nickel in the lithium-transition metal oxide is 80 mol % or more based on a total number of moles of all elements except for lithium and oxygen.

* * * * *